United States Patent Office 2,919,284
Patented Dec. 29, 1959

2,919,284

DIBENZACEDIANTHRONE

Armin Caliezi, Basel, Switzerland, assignor to Ciba Limited, Basel, Switzerland, a firm of Switzerland No Drawing. Application September 30, 1957
Serial No. 686,832

Claims priority, application Switzerland October 4, 1956

1 Claim. (Cl. 260—351)

This invention provides new dyestuffs of the acedianthrone series which probably correspond to the general formula (1)

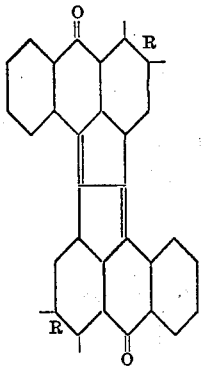

in which R indicates a ring system consisting of 5- or 6-membered rings, and also their substitution products.

These dyestuffs are obtained when compounds of the general formula (2)

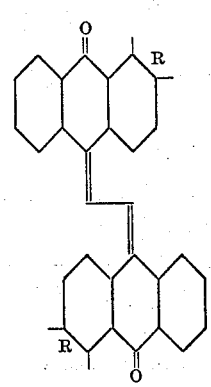

or (3)

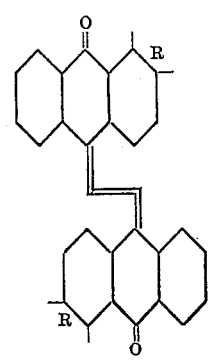

are treated with agents which effect ring closure to the acedianthrone.

The compounds of Formula 2 used as starting materials for the present process can be obtained by condensation of the anthrones of the formula (4)

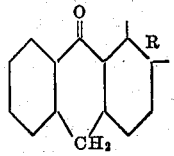

or carboxylic acids of the formula (5)

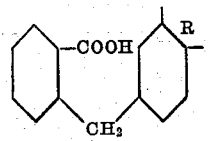

with glyoxal or an agent providing glyoxal, for example glyoxal sulfate. The anthrone of the Formula 4 can be obtained either by reduction of the corresponding anthraquinone with nascent hydrogen or by treatment of a compound of the Formula 5 with an agent splitting off water, for example sulfuric acid or hydrofluoric acid.

The compound of the Formula 3 can be obtained by treatment of the compound of the Formula 2 with alkaline condensing agents, for example with an alkali metal hydroxide.

In the above formula R indicates a ring system consisting of 5- or 6-membered rings, for example an aromatic system, such as a benzene or naphthalene ring or a heterocyclic ring system, for example an oxazole, imidazole, thiazole, pyrazole, pyrazine, oxazine or dioxine ring.

The ring closure of the compounds of the Formulae 2 and 3 to the acedianthrones can be carried out by customary methods by heating with acid condensing agents, such as aluminum chloride, sulfuric acid, chlorsulfonic acid, preferably in the presence of an oxidising agent, for example per-sulfuric acid, sulfur trioxide, or in an organic solvent such as nitrobenzene, tetrachlorethane, in the presence of an acid anhydride or acid chloride such as $P_2O_5$, or acetic anhydride and/or sulfuric acid.

With the compounds of the Formula 1 obtained by the process of the invention if desired further reactions can be carried out. Thus, for example, they can be treated with halogenating or nitrating agents. With the resulting halogen-containing or nitro group-containing compounds, still further reactions can be carred out, for example the nitro groups can be reduced and the resulting acedianthrones containing amino groups can be acylated, for example with benzoyl chlorides or anthraquinone carboxylic acid chlorides.

The compounds of the Formula 1, obtained according to the invention, and also the products obtained therefrom by further reactions, constitute valuable vat dyestuffs which are suitable for the dyeing of a wide variety of materials, especially for the dyeing and printing of fibers of natural and regenerated cellulose and are also suitable as pigments.

Whereas with other derivatives of acedianthrone red brown dyeings are obtained, the dyeings from the dyestuffs obtained according to the present invention are surprisingly distinguished by very desirable black brown shades.

The following examples illustrate the invention, the parts and percentages being by weight unless otherwise stated and the relation between part by weight and part by volume being the same as that between the kilogram and the liter.

Example 1

Into a solution of 60 parts of nitrobenzene, 5 parts of 96% sulfuric acid and 13 parts of acetic anhydride are introduced 5 parts of bis-(1':2'-benzanthronylidene-10)-ethane, obtained by condensation of 2 mols of 1:2-benzanthrone-9 with 1 mol of glyoxal sulfate in glacial acetic acid. The mixture is heated within 1½ hours to 100° C., then cooled to 20° C. and filtered and the filter residue washed with nitrobenzene, alcohol and water. A black brown powder is obtained which dyes cotton from an olive brown vat in fast violet brown shades and is excellently suitable for printing cotton or staple fiber.

The bis-(1':2'-benzanthronylidene-10)-ethane used as starting material can also be obtained by heating 2-benzylnaphthalene-2'-carboxylic acid with glyoxal sulfate in glacial acetic acid.

Example 2

3.5 parts of the product prepared according to Example 1 are dissolved in 70 parts of 96% sulfuric acid and treated slowly at 0–5° C. with 0.5 part of 98.7% nitric acid. Stirring is then carried out for 2 hours at 0–5° C. and then for 17 hours at 20° C. and the reaction product is poured into water. The precipitated substance is washed with water and then heated for 1 hour to 55° C. in a solution of 300 parts of water, 30 parts of 30% sodium hydroxide solution and 20 parts of sodium hydrosulfate. The leuco compound produced is oxidised by addition of the sodium salt of m-nitrobenzene sulfonic acid. The product is then filtered off, washed until neutral and dried. It is a monoamino derivative.

Example 3

2 parts of the product prepared according to Example 2 are heated within 1 hour to 100° C. in 30 parts of nitrobenzene in the presence of 0.65 part of 1-nitroanthraquinone-2-carboxylic acid chloride. Then a further 0.65 part of 1-nitroanthraquinone-2-carboxylic acid chloride is introduced and the whole heated within 3 hours to 200–205° C. and stirred for 17 hours at this temperature. Cooling is then carried out to 70° C. and the dyestuff filtered and washed consecutively with nitrobenzene, alcohol, warm 5% ammonia and water. After drying, a black brown powder is obtained which dyes cotton from the vat in dark brown fast shades.

By using as acylating agent in the preceding paragraph benzoyl chloride, p-chlorobenzoylchloride or terephthaloyl chloride brown dyestuffs having similar properties are obtained.

Example 4

1 part of the dyestuff produced as described in Example 1 is dissolved in 10 parts by volume of chlorosulfonic acid and the solution is treated at 0–5° C. with 0.42 part of bromine and a trace of iodine. The temperature is allowed to rise overnight to 20° C. and the whole then heated for an hour at 50° C. After the customary isolation 1.4 parts of a product are obtained which dyes cotton in reddish brown shades.

Example 5

1 part of the dyestuff obtained according to Example 1 is vatted in 100 parts of water at 45° C. with 2 parts of sodium hydrosulfite with the addition of 4 parts by volume of 30% sodium hydroxide solution. The resulting stock vat is added to a solution of 4 parts by volume of 30% sodium hydroxide solution and 2 parts of sodium hydrosulfite in 2,000 parts of water. In the resulting dye bath 100 parts of cotton are dyed for 1 hour at 40–50° C. with the addition of 10 parts of sodium chloride. The cotton is then squeezed off, oxidised in the air, rinsed, acidified, rinsed again and soaped at the boil. It is dyed in violet brown shades of outstanding fastness properties.

Example 6

200 parts of the finely divided dyestuff obtained according to Example 1 are mixed to a paste with 100 parts of water, 600 parts of a potash thickening (prepared from 90 parts of wheat starch, 330 parts of water, 100 parts of glycerol, 140 parts of British gum, 170 parts of tragacanth mucilage and 170 parts of potassium carbonate) and 100 parts of hydrosulfite. A cotton fabric is printed with this paste. After printing, drying is carried out at moderate heat and then steaming at 101–103° C. for 5–10 minutes in air-free wet steam, rinsing in running water and soaping at the boil. A strong, fast violet brown print is obtained.

What is claimed is:

The vat dyestuff of the formula

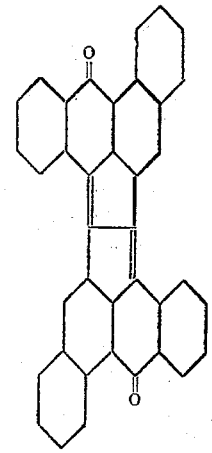

References Cited in the file of this patent

UNITED STATES PATENTS 2,385,185    Batty et al.    Sept. 18, 1945

FOREIGN PATENTS 672,905    Great Britain    May 28, 1952

OTHER REFERENCES

Zerweck et al.: German Patent App. C 5764 IV 6/22b, Oct. 13, 1955.